United States Patent Office 3,803,113
Patented Apr. 9, 1974

3,803,113
PURIFICATION OF OLEFIN POLYMERS
Claude Gluntz and Pierre Meyer, Seine Maritime, France, assignors to Compagnie Francais de Raffinage, Paris, France
No Drawing. Continuation of application Ser. No. 50,977, June 29, 1970, which is a continuation-in-part of application Ser. No. 691,138, Dec. 18, 1967. This application May 11, 1972, Ser. No. 252,279
Claims priority, application France, Dec. 20, 1966, 88,204; Dec. 5, 1967, 130,976
Int. Cl. C08d 5/00, 5/02
U.S. Cl. 260—93.7                    11 Claims

ABSTRACT OF THE DISCLOSURE

In order to eliminate even traces of metallic and/or acidic either actual acids or Lewis acids impurities from high molecular weight olefinic or diolefinic polymers which have been catalytically polymerized using as a catalyst system a Ziegler-type catalyst and which catalysts introduce metallic or acidic impurities, a solution of the impure polymers is treated with one of a variety of hydrocarbon polymer materials having distributed along the chains thereof functional groups which are Lewis bases (for example, ethers, thioethers, tertiary amines, tertiary phosphides, simple or multiple heterocyclic materials containing oxygen, sulfur, and/or nitrogen atoms with all valences saturated by carbon, etc.) until the impurities have been retained (chemically or otherwise) by the Lewis base moiety containing polymer material; the Lewis base polymer material is then separated from the purified polymer product and regenerated for treating the Ziegler type catalyst containing polymer.

---

This is a continuation of application Ser. No. 50,977, filed June 29, 1970, which in turn is a continuation-in-part of application Ser. No. 691,138, filed Dec. 18, 1967.

This invention relates to the purification of high molecular weight hydrocarbon polymers such as derived of olefinic and diolefinic hydrocarbon monomers and, more particularly, to the elimination from such hydrocarbon polymers of metallic impurities originating from a polymerization catalyst used to polymerize these monomers. More particularly, this invention related to treating a solution of the hydrocarbon polymer with a polymer carrying Lewis base moieties which will retain and remove the impurities formed in the hydrocarbon polymer because of the use of Ziegler-type catalysts.

As will be understood there may be a variety of ways of eliminating metallic impurities from high molecular weight or macromolecular olefinic and diolefinic hydrocarbons, when the impurities are present in relatively significant concentrations. However, the complete removal of mere traces of such impurities is much more difficult to accomplish. Yet, even small traces of certain metallic or organometallic impurities in many such hydrocarbon polymers may reduce the transparency of the polymer material and/or promote the degradation of the polymer by oxidation, etc.

Also, as will be understood, homopolymers and/or copolymers of alpha-olefins and diolefins are useful and desired for many different applications. These polymers are readily obtained at low pressures and yield very high molecular weight products with catalyst systems or materials (for example, of the Ziegler type) containing a compound of a transition metal and a metallic reducing compound.

Yet, one important disadvantage of a Ziegler-type polymerization process resides is that a portion of the catalyst system or catalyst combination remains dissolved in a polymer solution. This gives rise to the problem of eliminating the catalyst when the desired polymer is obtained.

Nevertheless, when the polymer is precipitated, it is difficult, if not impossible, to avoid the precipitate's containing at least minor traces of components from the catalyst system. As noted before, these traces are harmful impurities in the polymers in many applications for which the polymers are desired.

A remedy for the removal of the residual catalyst impurities is a principal object of this invention.

Using a Ziegler-type catalytic polymerization, as is well known, involves polymerizing a monomer dissolved in a hydrocarbon solvent under an inert atmosphere in the presence of the catalyst combination of (a) a transition metal compound and (b) a reducing compound.

When the catalytic polymerization involved is such as forming homopolymers or copolymers of α-olefins, terpolymers of two α-olefins and a diolefin with a non-conjugated double bond: homopolymers and copolymers of diolefins with conjugated double bonds, etc., with a Ziegler-type catalyst, trace elements of metallic material are particularly likely to be included in the polymer product and capable of degrading it. In particular, the novel purification process is addressed to such catalytic polymerization reactions.

Among the transition metal compounds conventionally utilized in such Ziegler-type catalyst systems may be noted the halides and oxyhalides (possibly excepting the fluorides) of the metals of Groups IVa, Va and VIa of the Period Table, as well as the halides and oxyhalides of iron, cobalt, and nickel. That is, conventional transition metal compounds utilized for the polymerization and copolymerization in Ziegler-type reactions may be illustrated by $TiCl_2$, $TiCl_3$, $TiCl_4$, $VCl_3$, $VCl_4$, $VOCl_3$, as well as organometallic compounds of transition elements such as, for example, $VO(OC_2H_5)_3$, the titanates, the acetonylacetonates of titanium or vanadium, etc.

As illustrative of the various metallic reducing compounds conventionally utilized in such a catalytic polymerization may be indicated, generally by a formula such as

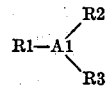

in which R1, R2, and R3 designate identical of different alkyl radicals or hydrogen. There may also be used a compound of the type

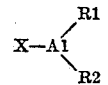

where X is an atom of chlorine, bromine or iodine, and R1 and R2 have the same significance as above. A further combination catalyst material may have a third constituent such as $AlCl_3$ or a compound of the type

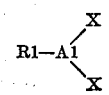

in which the symbols have the same significance as above. The reducing compound may also contain a compound of tin or beryllium such as

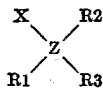

or

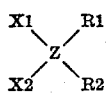

where X, X1, and X2 represent chlorine, bromine, and/or iodine, and R1, R2, and R3 represent alkyl and/or aryl radicals provided when Z is beryllium the compounds are disubstituted with said substituents.

A number of attempts have been proposed to counteract the aforementioned difficulties and remove in one way or another those portions of the catalytic system which remain in the polymer. For example, one suggestion was to treat the polymer, recovered by filtration from a polymerization reaction, with an alkaline solution of an alcohol in the presence of molecular oxygen, and another suggested treating a suspension of the polymer with a mixture of an alcohol having 3 to 8 carbon atoms per molecule and a base or a salt of an organic acid. Yet another suggestion was adding to a suspension of the resulting polymer an alcohol and a chelating agent at 100°–250° C. and then adding a precipitating agent and cooling to a temperature between 20° and 110° C. to precipitate the polymer. Another suggestion was to add a primary amine to the polymer solution and wash the mixture with water-free alcohol.

As is apparent from the foregoing and well understood, all these various proposals for attempting to eliminate from such olefin and diolefin polymers and copolymers the last traces of metallic contaminants retained from the polymerization catalyst involve extensive and sometimes complicated additional processing. In any event, difficulties may be encountered in attempting to carry out such additional processing as a practical matter, especially in commercial scale operations.

Furthermore, when an alcohol or some other product is added to the polymer solvent, the latter cannot be recycled as such for use in additional polymerization reactions, but it must be repurified to eliminate the impurities introduced during the alcohol treatment and, of course, the treating alcohol.

Additionally, even utilizing such more complicated and expensive subsequent treating techniques, difficulties still may be encountered in the complete removal of all traces of the metallic contaminants originating from the polymerization catalyst, and even small traces of such contaminants decrease the value of the polymer obtained.

In copending application Ser. No. 431,444, filed Feb. 9, 1965, and now abandoned, there is suggested a process for removing certain aluminum alkyl compounds used as catalysts in oligomerization reactions with olefins. As disclosed therein, the liquid oligomer from the reactions is treated with a macromolecular organic solid having atoms of oxygen, sulfur, or nitrogen and an electronic density sufficiently high to form secondary valence linkages with the aluminum alkyl compound which it is desired to separate from the oligomer, but which macromolecular solid does not include any functional groups capable of degrading the oligomer. Such copending teaching, however, is only concerned with the purification of oligomers (which are materials liquid at room temperature) by the elimination of aluminum alkyl compounds which they may contain. Generally in the case of long chain polymers obtained with a catalyst containing both a reducing metallic compound and a compound of a transition metal, it is desired to purify the polymers by eliminating all traces of catalytic contaminants if polymers of superior quality are to be obtained. Especially when it is recalled that the Ziegler-type polymers to which this invention is particularly applicable are solid, rather than liquid at room temperatures, and thus not readily susceptible to such purification treatments as with the liquid oligomers noted.

According to the present invention, olefin polymers as disclosed herein, have an approximate minimum molecular weight of about 10,000 which corresponds to about 700 carbon atoms per molecule. As it is well understood, chain length of the olefin polymers vary; and hence, the above minimum molecular weight in reality is an average or a range. Another means for defining the present polymers are by (a) the Shore hardness (ASTM Standard D–875) polymers which have a Shore hardness of at least 40, or (b) by the Vicat softening point, i.e. under a load of 1 kg./mm.$^2$. The polymers herein have a Vicat softening point of more than 80° C.

As a summary of the prior art, the following items place the prior art in perspective.

(1) In reference to the olefin polymer, it is noted that olefins such as long chain olefins may be obtained from trialkyl aluminum compounds; however, high molecular weight polymers cannot be obtained starting from these substances (cf. K. Ziegler, Angew. Chem., vol. 64, p. 323 (1952).

(2) It is possible to prepare high molecular weight polymer from ethylene in the presence of an aluminum trialkyl and of a catalyst which is an element of Groups IV to VI of the Periodic System (cf. K. Ziegler, Angew, Chem., vol. 67, pp. 426 and 541 (1955). Thus, polypropylene can be prepared in good yields in crystalline form only if one uses a catalyst "of the Ziegler type."

(3) Catalysts known as "of the cationic type," e.g., $H_2SO_4$, $BF_3$, $AlCl_3$, $TiCl_4$, $ZnCl_2$, $FeCl_3$ can give high molecular weight polymers if polymerization is carried out at $-100°$ C., but these polymers are amorphous and oily (cf. Ind. and Eng. Chem., vol. 44, p. 2955 (1952).

(4) Still further, the so-called "Phillips" catalysts (chromium or molybdenum oxide) in a polymerization reaction impart to the polymer the same properties as the products obtained with the "cationic catalysts (cf. German Pat. 1,051,004).

For sake of clarity, the polymers of the present invention are those produced according to Item 2 above. Accordingly, the following type of polymers are prepared by using the following catalysts:

(A) Polyethylenes—employing as catalysts:

$TiCl_4/AlEt_3$
$TiCl_4/AlEt_2Cl$
$Ti(OR)_3Cl/Al_2Cl_3Et_3$
$Ti(OR)_2Cl_2/Al_2Cl_3Et_3$ (B) Polypropylenes and higher olefin polymers such as polymerized butene-1 are prepared by using:

$TiCl_3/AlEt_3$
$TiCl_3/AlEt_2Cl$ (C) E-P rubber polymers (E-P Rubber is ethylene propylene rubber and EPDM ethylene-propylene-diene monomer rubber wherein the dienes are such as a bicyclo compound; the diene compounds are disclosed in a number of U.S. patents) are prepared by using:

$TiCl_3/AlEt_3$
$TiCl_3/AlEt_2Cl$ (D) E-P rubber polymers (EPR: ethylene propylene rubber, and EPDM, ethylene-propylene-diene (see description above) are also prepared by using:

$VOCl_3/Al$ (n-hexyl)$_3$
$VCl_4/Al$ (n-hexyl)$_3$
$VCl_3/Al$ (n-hexyl)$_3$
V (acetyl acetonate)$_3$/AlClEt$_2$
$VOCl_3$ (Al/isobutyl)$_3$ In general, the amounts of impurities present in the mixtures to be purified are, e.g., in the case of polyethylene about 250 p.p.m. Ti, 4000 p.p.m. Cl and 1500 p.p.m.

Al; when other polyolefins are made, larger amounts of impurities are encountered.

Heretofore, because of the difficulty of purification, the amounts of impurities permissible after purification of the polymer have been set at:

100 p.p.m. Ti,
200 p.p.m. Al,
200 p.p.m. Cl, and
20 p.p.m. V.

In contrast, the amounts of these impurities which can be reduced when practicing the novel process are as follows:

10 p.p.m. Ti;
20 p.p.m. Al;
150 p.p.m. Cl;
10 p.p.m. V.

Thus, according to this invention and by contrast from the prior art, there is provided for the purification of long chain olefin and diolefin polymers and the substantially complete elimination therefrom of even small traces of metallic contaminants, such as originate from Ziegler-type catalyst with which the polymers were produced in the first place, in a simple and readily accomplished manner by treating the resulting polymers with a hydrocarbon polymer treating material having distributed along the hydrocarbon chain thereof functional groups which are or include Lewis bases for attracting or retaining or combining with the metallic contaminants, and then separating the purified olefinic or diolefinic polymer as a product and recovering both the polymerization solvent and the hydrocarbon polymer treating material for re-use in the polymerization and purification of additional olefinic or diolefinic polymers. As a further feature of this invention, a rapid and substantially complete purification of the polymer product is obtained by the elimination of metallic contaminants originating from the catalyst even if the catalyst is wholly or partly soluble in the polymerization solvent or medium, and provides for the direct recovery of the polymerization solvent for re-use without further purification and, ultimately, for recovery of at least insoluble portions of the polymerization catalyst for re-use.

With the foregoing and additional objects in view, this invention will now be described in more detail, and other objects and advantages thereof will be apparent from the following description and the appended claims.

The hydrocarbon polymer treating material with the Lewis base functional groups is regenerated in accordance herewith, described in more detail below, for recirculation for purifying additional quantities of the macromolecular polymer product obtained from the Ziegler polymerization, thus providing a continuous process for production and purification of such macromolecular olefinic and diolefinic polymers and copolymers.

Merely for reasons of simplicity of expression, the term "basic radical polymers," as used hereinafter and in the claims hereof, is to be understood as meaning and generically including the various hydrocarbon polymer treating materials in accordance herewith having distributed along the hydrocarbon chains thereof any of a variety of functional groups comprising or including Lewis bases. Merely as illustrative of such materials for treating and purifying olefinic and diolefinic polymers in accordance herewith, but without any limiting sense, one may note such functional groups as ethers, thioethers, tertiary amines, tertiary phosphides, simple or multiple heterocyclic radicals containing atoms or groups of atoms of oxygen, sulfur and/or nitrogen all the valences of which are saturated by carbons, etc.

More specifically, one may note as illustrative of basic radical polymers, with which satisfactory results have been achieved in accordance herewith, as examples of those having an ether-type functional group polyphenylene oxide

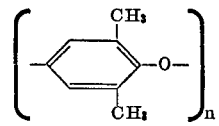

or polyparamethoxystyrene

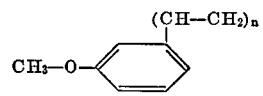

reticulated (crosslinked) with 20% by weight divinylbenzene, or polycyclohexylene oxide

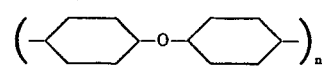

As an example of a basic radical polymer having thioether functional groups may be noted polyethylvinylsulfide

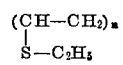

reticulated (crosslinked) with 20% by weight of divinylbenzene. An example including a tertiary amine as the basic functional group is poly-N-vinyl carbazole

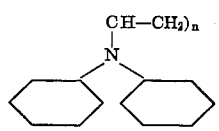

reticulated with 20% by weight of divinylbenzene. An example of a satisfactory basic radical polymer where the functional groups are from heterocyclic compounds having an atom of nitrogen with all valences saturated by carbon atoms is poly-2-vinylpyridine and/or poly-4-vinylpyridine reticulated with 20% by weight of divinylbenzene as indicated, respectively, by

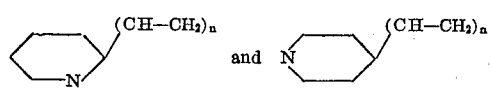

An example of a basic radical polymer containing multiple heterocyclic functional groups is polyacrylonitrile of the formula

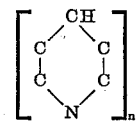

An example of a basic radical polymer having heterocyclic functional groups with atoms of nitrogen and oxygen is polyoxadiazole

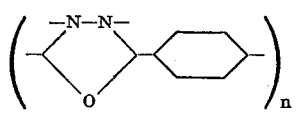

Although the foregoing examples of basic radical polymers for use as the treating materials in the purification of olefin and diolefin polymers and copolymers in accordance herewith, it may be noted that each of them was tested with satisfactory results in the purification of copolymers of ethylene and propylene obtained by a Ziegler polymerization in which the transition metal was vanadium and the metal of the reducing compound was aluminum. In all cases, the purified copolymer contained less than 7 p.p.m. of vanadium calculated as the elemental metal.

In accordance with the above, the following Lewis-base polymers are disclosed as being suitable in the novel purification process:

polyvinyl-4 pyridine;
polyvinyl-2 pyridine;
poly-N-vinyl carbazole;
pyrolyzed polyacrylonitrile;
polyoxadiazole;
polyphenylene oxide;
poly-para-methoxy styrene;
polycyclohexene oxide;
polyethyl vinyl sulfide;
polyazomethyne;
polytriazole;
polybenzimidazole;
polyquinoxaline;
polybenzoxazole.

As generally illustrative of the manner of carrying out a process embodying and for practicing this invention, one may note that the polymer to be purified is put in contact with the basic radical polymer after the polymerization reaction. For the sake of simplicity and economical operation, this treatment step is preferably carried out in the polymerization reaction medium after polymerization is complete and while the resulting olefin or diolefin polymers or copolymers obtained by the reaction are dissolved in the polymerization solvent. For example, any unreacted monomer is first eliminated (as by degasing under vacuum or in an inert gas atmosphere such as nitrogen or a fare gas). If the polymer or copolymer obtained from the reaction is not completely dissolved in the reaction solvent, it is made to dissolve therein as by heating the mixture or adding more solvent or both. Thus, if it is necessary, any of the polymer which has grown upon or become affixed to the catalyst should be loosened, in known manner, by treating the reaction mixture with hydrogen under pressure, although this step is usually not necessary if the catalyst employed for the polymerization was entirely soluble in the reaction medium.

Preferably, the next step is performed in an inert atmosphere, after degasing any hydrogen which may be present, and the reaction solution is treated with the basic radical polymer in such inert atmosphere. This can be accomplished before eliminating any portion of the catalyst combination which is insoluble or undissolved in the reaction solution or, if there is such undissolved portion, it can readily be filtered out in known manner prior to treating the polymer product with the basic radical polymer treating material.

The actual treating or contacting the olefin or diolefin polymer or copolymer product with the basic radical polymer material may satisfactorily be accomplished in a variety of well understood techniques conventionally employed for this type of operation. For example, and among others, the basic radical polymer can be introduced in the form of a powder into the reaction solution and the resulting mixture agitated during the time necessary for the basic radical polymer to attract and retain the metallic elements which are desired to be eliminated, after which the mixture is filtered in a manner to retain on the filter the basic radical polymer and, of course, the soluble metallic components of the catalyst which it attracted and retained. Alternatively, the solution of catalyst and polymer product may be passed over a fixed bed of basic radical polymer which retains the metallic elements of the polymerization catalyst as the mixture passes over and through the bed.

Generally, the quantity of basic radical polymer utilized should be such that there are sufficient basic functional groups available on the polymer to retain all the metallic elements contained in the mixture or medium being purified. Thus, considering the number of such basic functional groups available per unit of weight of basic radical polymer, a larger or smaller quantity of the entire polymer should be utilized. As will be apparent, the actual amount of basic radical polymer required satisfactorily to treat any given quantity of olefinic or diolefinic polymer product will be different depending upon which basic radical polymer is used, yet the determination of an appropriate quantity of treating material is readily calculated by men skilled in this art without inventive experimentation.

For example, measuring the number of ions of a strong acid (HCl for example) retained by a given quantity of the particular basic radical polymer to be used indicates in known and well understood manner the quantity of that particular basic radical polymer required to attract and retain or eliminate the amount of whatever metallic contaminants are known to be present in the reaction solution being purified. Generally satisfactory results are obtained with the contact time of basic radical polymer with the solution being treated being approximately within the range of from 3 to 90 minutes, although, as will be apparent, this contact time may vary widely depending upon the particular basic radical polymer used, the degree of the activity thereof, the conditions or circumstances providing contact and mixture with the solution being purified, the identity of the metallic contaminants being eliminated, the quantity thereof in the solution, etc. Here again, however, these merely operational variations are readily calculated or determined by men skilled in this art in accordance with the teachings hereof without inventive experimentation.

After purification by treating the reaction medium with the basic radical polymer material, the reaction products are satisfactorily recovered by a variety of known and convenient means, as will be understood, and as indicated in more detail below. Actually, operating in accordance with this invention offers the advantage that there is no need to modify in any respect the polymer or copolymer reaction products from the chemical and physical states in which they would exist if the metallic impurities had not been eliminated therefrom. For example, the polymer product may be precipitated from the solution with the aid of a conventional precipitant (such as alcohol, for example), but the polymer product may also be precipitated merely by lowering the temperature, with the latter technique being preferred because it does not include polluting the reaction solvent with a precipitating agent. Alternatively, the polymer product is satisfactorily recovered by distillation or evaporation of the reaction solvent, with, of course, recovery of the latter for later use.

Among the advantages of this invention is that the basic radical polymer treating material is readily regenerated after a purification treatment and can be re-used almost indefinitely for purifying additional quantities of polymer or copolymer product. Such regeneration steps are preferably preceded by washing the basic radical polymer with a solvent, preferably that of the reaction medium, in a manner to eliminate whatever traces of reaction product (olefinic or diolefinic polymers or copolymers) may possibly be on or in the basic radical polymer material. There after, as illustrative of one regenerating technique with which satisfactory results have been achieved in accordance herewith, the basic radical polymer is treated with a strong acid solution in a manner to dissolve from it the metallic elements removed during the purification step and which are retained by the basic radical polymer by virtue of the basic nature of the functional groups thereon. Then the basic radical polymer is washed with a strong base (such as sodium or potassium hydroxide, etc.) in order to regenerate the basic nature of the functional groups and eliminate from the surface of the polymer any strong acid ions which may have become affixed there during the strong acid treatment. Finally, after the basic wash, the polymer is washed with water until a substantially neutral pH is obtained.

It should be noted that the first treatment with strong acid may not always be necessary and that merely washing with a strong base may suffice to regenerate the basic nature of the functional groups of the basic radical polymer such alkaline wash directly neutralizing the retained metallic materials. Particularly is this simplified regeneration technique applicable when the original polymerization catalyst (and the metallic contaminants therefrom) include metals such as vanadium which readily form sodium vanadates directly when contacted with a strong sodium hydroxide solution and, as such, are readily washed free of the basic radical polymer with water. As will be apparent, the possibility of avoiding treatment of the basic radical polymer with a strong acid provides the advantage of eliminating a treatment step in the regeneration of the basic radical polymer for re-use.

As will also be understood from the foregoing, it is possible, if the basic functional groups of the basic radical polymer are relatively strong, that absolutely all of the retained metallic contaminants are not removed from the surface thereof in each regenerating cycle. Nevertheless, satisfactory results are achieved in accordance herewith if the basic radical polymer possesses, after even a partial regeneration, a sufficient number of basic functional groups available for eliminating from the polymer solution to be purified whatever metallic contaminants may be present therein. Thus, absolutely complete regeneration of the basic radical polymer is not necessary each and every cycle for obtaining the advantages of this invention.

In order somewhat more graphically to describe or illustrate techniques embodying and for practising this invention with which satisfactory results have been achieved, there is set forth below a summary, somewhat in flow sheet form, of the various steps in accordance herewith for the purification of the polymer product obtained from a Ziegler-type polymerization and utilizing as the basic radical polymer reticulated poly-4-vinyl-pyridine.

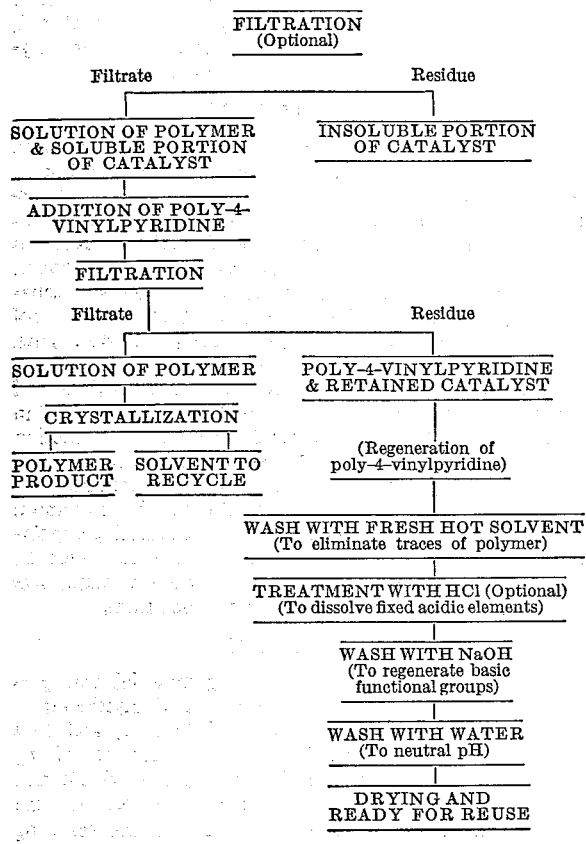

It should also be noted that techniques embodying and for practising this invention are also satisfactory for accommodating the purification of the polymer product resulting from a cationic polymerization reaction of the Ziegler-type utilizing a catalyst such as $AlCl_3$—e.g., such a polymerization as is effected in the manufacture of so-called "butyl" rubber from isobutylene and isoprene. In utilizing the teachings hereof for a similar purification of the polymers of such reaction, however, care must be taken to select the polymerization solvent and the basic radical polymer treating material so that a quaternary amine chloride will not be formed in the course of the purification and regeneration steps. Similarly, one can consider as similar to polymers obtained by a Ziegler-type polymerization, and treat in accordance with this invention, certain products of Friedel-Crafts types of reactions catalyzed by $AlCl_3$ with satisfactory results and substantially in accordance with the teachings hereof, as will be readily understood. As an example illustrating such further application may be noted such reactions as the alkylation of benzene by ethylene as the first step in the preparation of styrene.

As further descriptive and illustrative of this invention, but not in any sense limiting thereof, one may note the following specific examples embodying and for practising this invention and with which satisfactory results have been achieved in accordance herewith:

EXAMPLE 1

A basic radical polymer was prepared by introducing 157.6 gms. of 4-vinylpyridine, 38.6 gms. of divinylbenzene of commercial grade, 600 cm.³ toluene, and 3 gms. azo-bis-isobutyronitrile into a reactor containing 1200 cm.³ water and 16.5 gms. polyvinyl alcohol (such as that known as Rhodoviol HS 100). The mixture is agitated at about 90° C. during about 24 hours and then allowed to cool. The polymer formed was separated by filtration, washed with water, and then extracted with alcohol and then xylene in a Kumagawa extractor. Upon drying, the polymer, which was reticulated poly-4-vinylpyridine, was in the form of a powder.

Separately, butene-1 was polymerized in a reactor containing 600 cm.³ paraxylene with a catalyst system made up of 2.25 millimoles violet $TiCl_3$ and 6 millimoles $Al(C_2H_5)_3$, with the pressure of butene-1 being maintained at about 800 mm. Hg and a temperature of about 70° C. At the end of the polymerization reaction, the butene-1 monomer which had not reacted was evacuated by degasing, and hydrogen was introduced into the reactor up to a pressure of 1 atm. After an additional period of agitation of about a half hour, the mixture was degased again to evacuate the hydrogen. Thereafter, the mixture thus obtained was decanted, under a ntrogen atmosphere, into a second reactor containing 12 gms. reticulated poly-4-vinylpyridine produced as indicated above and dispersed in 50 cm.³ paraxylene. The entire mixture noted above was agitated for about an hour at 110° C. and filtered at 138° C., with the liquid filtrate containing about 30 gms. polybutene-1 purified as desired.

In order to recover the purified polybutene-1-product, the solution was divided into three parts, and the polybutene-1 product was separated by three different methods, primarily for purposes of comparison and illustration here. In the first method, the polybutene-1 was precipitated by the addition of ethanol. After drying, the polymer contained only about 100 p.p.m. of chlorine, less than 5 p.p.m. of titanium, and less than 10 p.p.m. of aluminum (as indicated by forming ash and analyzing it spectographically). By the second method, the filtrate was evaporated and the polymer therein which was recovered showed the same composition as above of chlorine, titanium, and aluminum. By the third method, the reaction solution was cooled to 20° C. and about 80% of the polymer was separated therefrom by decantation. After drying the polymer, analysis showed that it contained about the same amounts of chlorine, titanium, and aluminum as the polymer samples recovered according to the two preceding methods.

As will be apparent from the foregoing, satisfactory results are achieved in accordance herewith by precipitating polybutene-1 with the practical elimination of contaminants from the catalyst system utilized in the polymerization reaction, and the product can be recovered without altering the solvent. Actually, in the second and third methods noted above, for example, the polymer product was obtained with substantially the same purity as in the first method and without poluting the paraxylene as a polymerization solvent without even requiring purification or regeneration thereof.

EXAMPLE II

The foregoing Example I was repeated but replacing $Al(C_2H_5)_3$ by $AlCl(C_2H_5)_2$, and the resulting purified polybutene-1 product recovered, with the aid of poly-4-vinylpyridine as the basic radical polymer treating material, showed substantially the same purity as that of the products treated in accordance with the previous example.

EXAMPLE III

Into a reactor of about 1 liter capacity was introduced 700 cm.$^3$ paraxylene which was saturated by passing therethrough as gaseous monomers ethylene and propylene each at charge rates of 23.75 l./h. at a temperature of about 70° C. After saturating the solvent with the olefin hydrocarbons, a polymerization catalyst combination was injected with the aid of a syringe and comprising about 3 millimoles $AlCl(C_2H_5)_2$ and one millimole $VOCl_3$. After about 45 minutes of the reaction, the monomer feed was interrupted, and 6 gms. of reticulated poly-4-vinylpyridine (prepared as described above in Example I) was introduced into the reactor as the basic radical polymer material for the purification treatment in accordance herewith. The resulting mixture was agitated for about an hour at 90° C. and then filtered. After evaporation of the solvent, there was recovered 15 gms. of a copolymer of ethylene and propylene as a desired product, which product contained only about 8 p.p.m. of vanadium.

EXAMPLE IV

The polymerization reaction of Example III was repeated under the same conditions except that the catalytic system was replaced by one made up of 6 millimoles $AlCl(C_2H_5)_2$ and 1.5 millimoles $V(OC_2H_5)_3$. The polymerization reaction was stopped after about 40 minutes, and the reaction mixture was treated by the addition of 10 gms. reticulated poly-4-vinylpyridine prepared as described above in Example I, and the resulting mixture was agitated at about 90° C. After filtering and evaporating the solvent, about 8 gms. copolymer of ethylene and propylene was recovered containing less than 5 p.p.m. vanadium.

EXAMPLE V

Into a reactor of about 1 liter capacity was introduced 700 cm.$^3$ n-heptane, which was saturated by introduction of gaseous ethylene monomer at the rate of 10.8 l./h. and propylene monomer at the rate of 36.7 l./h. at a temperature of about 30° C. A catalytic combination or system made up of 3 millimoles $AlCl(C_2H_5)_2$ and 1 millimole $VOCl_3$ was injected with a syringe. The polymerization reaction was stopped after about 40 minutes, and there was added to the reaction solution 7 gms. reticulated poly-4-vinylpyridine prepared as already described after which the resulting mixture was agitated for about an hour at about 80° C. After filtering and separating the resulting copolymer by evaporation of the heptane solvent, 20 gms. of copolymer was obtained containing less than 5 p.p.m. vanadium.

EXAMPLE VI

In apparatus like that of Example V, 700 cm.$^3$ n-heptane was saturated with gaseous ethylene and propylene monomer as indicated in that example, and then there was introduced 24 millimoles dicyclopentadiene, 3 millimoles $AlCl(C_2H_5)_2$, and 1 millimole $VOCl_3$. After about two hours of reaction, the resulting polymerization mixture was admixed with about 12 gms. of reticulated poly-4-vinylpyridine prepared as previously indicated, and agitated for about two hours at about 80° C. The heptane solvent was then separated by evaporation from the resulting terpolymer, of which about 13 gms. were obtained containing only about 13 p.p.m. vanadium.

EXAMPLE VII 700 ml. tetrahydro-1,2,3,4-naphthalene was saturated by introduction of gaseous ethylene in a reactor, after which there was injected with a syringe about 0.5 millimole $TiCl_4$ and about 1 millimole $AlCl(C_2H_5)_2$. After about an hour of reaction at a temperature regulated to about 25° C., the reactor was degased to eliminate unreacted ethylene, and there was then introduced hydrogen at a pressure of about 1 atm. with agitation during about an hour at 150° C. After another degasing step to eliminate the hydrogen, there was admixed into the resulting solution about 5 gms. reticulated poly-4-vinylpyridine for about an hour at 150° C., after which the mixture was filtered and the resulting polymer precipitated in methanol. After drying, 27 gms. of polymer was obtained containing less than 5 p.p.m. titanium.

EXAMPLE VIII 700 ml. of the same solvent as in the foregoing example was saturated with gaseous propylene in a similar reactor in which there was then broken an ampule containing 2 millimoles $TiCl_3$ and 5 millimoles $Al(C_2H_5)_3$, while the temperature was maintained at 70° C. After the reaction was completed, the mixture was degased, agitated for about an hour at about 180° C. in the presence of hydrogen, again degased, and admixed with 15 gms. reticulated poly-4-vinylpyridine for about an hour at 180° C. After filtering, precipitating the resulting polymer in methanol, and drying, there was obtained about 32 gms. of polypropylene containing less than 5 p.p.m. titanium.

EXAMPLE IX

Another basic radical polymer material was prepared by introducing 19.76 gms. paramethoxystyrene, 4.7 gms. divinylbenzene, 80 cm.$^3$ toluene, and 0.40 gm. azo-bis-isobutyronitrile into a reactor containing about 140 gms. water and about 2.2 gms. polyvinyl alcohol. The reaction mixture was agitated at about 80° C. for about 24 hours, and then, after cooling, the resulting polymer was separated by filtration, washed in water, extracted in alcohol and then n-heptane, finally to obtain about 40.2 gms. reticulated polyparamethoxystyrene.

Separately a copolymerization reaction of ethylene and propylene was carried out following the conditions noted in Example V above, and the resulting copolymer solution was admixed with about 40.2 gms. of the reticulated polyparamethoxystyrene basic radical polymer treating material noted above and agitated for about an hour at about 80° C. After filtration and separating the resulting copolymer obtained by evaporation of the solvent, about 18 gms. of the ethylene-propylene copolymer product was obtained containing less than 5 p.p.m. vanadium.

EXAMPLE X

Yet another basic radical treating material was prepared by introducing about 43.20 gms. ethylvinylthioether, 10.80 gms. divinylbenzene, 180 cm.$^3$ toluene, and 1.04 gms. azo-bis-isobutyronitrile into a reactor containing about 320 gms. water and 5.2 gms. polyvinyl alcohol. After about 24 hours of agitation at about 80° C., the reaction mixture was cooled, filtered, and the resulting basic radical polymer extracted with alcohol and n-heptane, to produce about 16.8 gms. of reticulated polyethyl-vinylthioether.

Separately, a copolymer of ethylene and propylene was prepared as indicated above in connection with Example V, with which was admixed 8.4 gms. of the above noted thioether basic radical polymer treating material for about an hour at 80° C. with agitation. After filtering and recovering the ethyl-propylene copolymer by evaporation of the solvent, there was obtained about 21 gms. of copolymer containing only 7 p.p.m. vanadium.

EXAMPLE XI

Purification of polybutene-1 in a column having a fixed bed of Lewis-base polymer was as follows:

Polymer to be purified is polybutene-1 obtained by continuous polymerization of butene-1. The reactor is maintained under butene-1 pressure and the temperature of the reactor is maintained at 70° C., xylene is fed at a rate of 1.5 l./hr. The catalyst used is $TiCl_3$ (Stauffer Chemical Co. brand) and $AlClEt_2$. $TiCl_3$ is obtained by reduction of $TiCl_4$ with activated aluminum so that $TiCl_3$ contains aluminum chloride $AlCl_3$. The contact time of the butene-1 in the reactor is 5½ hours.

The polymer contains before purification:

6,000 p.p.m. Ti
19,000 p.p.m. Cl
8,000 p.p.m. Al

These amounts are very large due to the fact that the polymerization of butene-1 requires large amounts of catalyst.

Purification of the polymer is carried out as follows: the solution of polybutene-1 containing 5.5 g./l. of polybutene-1 in xylene is passed through a column packed with crosslinked pyridine polyvinyl-4 resin. After passage through the resin, the polybutene-1 is precipitated by methanol. The polymer then contains:

Ti<1 p.p.m.
Cl≃60 p.p.m.
Al≃100 p.p.m.

In each of the preceding examples, the various basic radical polymer treating materials were themselves recovered generally in accordance with the regeneration steps discussed above and, more specifically, in accordance with those noted in the flow sheet outline set forth above illustrating the features of a process in accordance herewith utilizing poly-4-vinylpyridine—i.e., by washing with solvent to eliminate traces of the product polymer, treatment with a strong acid to remove metallic and/or acidic compounds fixed to the basic functional groups of the basic radical polymer, washing with sodium hydroxide to regenerate such basic functional groups, washing with water to remove the alkaline material to a neutral pH, and drying to return the basic radical polymer treating material to a condition where it is regenerated and adapted for recycling and re-use in an additional purification treatment process in accordance herewith. Following such teachings, the basic radical polymer treatment material can be used virtually indefinitely in successive purifications of various polymer products as disclosed herein for the elimination therefrom of minute traces of acidic or metallic contaminants included with the polymer or copolymer products from the Ziegler-type or other reaction catalysts on which the products were produced in the first place, all as set forth above.

As is apparent from the foregoing, there is provided, in accordance herewith, for the purification and elimination from various olefinic and diolefinic polymers and copolymers synthesized in Ziegler-type catalytic polymerization reactions (and such other comparable or equivalent chemical reaction as suggested or disclosed above) of even minor but still deleterious traces of acidic or metallic contaminants introduced into the polymer or the copolymer products from the Ziegler-type polymerization catalyst (or other reaction catalysts) in a manner which is both inexpensive and readily accomplished on even a commercial scale, and involved no more than treating the resulting polymer product solution with any one of a variety of hydrocarbon polymer treating materials having distributed along the hydrocarbon chain thereof one or more of a variety of functional groups of the nature of a Lewis base (referred to herein as "basic radical polymers"). Furthermore, the basic radical polymer treating material utilized to accomplish the ultimate purification of the principal polymer product in accordance herewith is itself readily recovered and regenerated for recycling or re-use in the purification treatment of additional quantities of polymer product in a manner such that, once the desired or appropriate basic radical polymer treating material is prepared, it can be re-used virtually indefinitely in the purification treatment of successive batches of different polymer products.

Similarly, although there are a variety of ways available in accordance with the teachings hereof for ultimately recovering the desired polymer product, there is indicated a preferred technique whereby the desired product may be purified in accordance herewith in manners which neither deteriorate nor even pollute the main reaction solvent, so that it can be re-used repeatedly for successive reaction batches. Regardless of the relatively simple regeneration steps for the basic radical polymer treating material (which themselves include no more than simple washing steps with acids and bases and water, some of which are not in every case necessary), the actual purification of the ultimate and important commercial product in accordance herewith requires no more than treating with the basic radical polymer and the conventional precipitation, evaporation, etc., steps which would otherwise be necessary even without purification in accordance herewith, rather than complex or expensive additional procedures or processing as required in other purification techniques for eliminating from Ziegler-type (or other) polymerization reactions the last traces of minor acidic or metallic contaminants originating from the polymerization or reaction catalysts which, even in minor or trace proportions, have a tendency to degrade the resulting polymer or other product and diminish the commercial value thereof.

While the methods and compositions disclosed herein form preferred embodiments of this invention, it is not limited to those precise methods and compositions, and changes may be made therein without departing from the scope of this invention which is defined in the appended claims.

What is claimed is:

1. In a process for the purification of a polymer of repeating units based on an olefin or diolefin precursors or mixtures of same wherein the polymer is a solid at room temperature, synthesized in a process using a Ziegler type catalyst and whereby polymer degrading metallic and acidic contaminants are introduced during the catalysis and are removed from an organic solvent solution of said polymer in which said polymer is synthesized, the steps which comprise in combination:

(1) treating with an impurity removing polymer defined herein below said solution of said polymer and said catalyst dissolved therein which olefin or diolefin precursor polymer contains as impurity producing compounds (a) and (b) wherein:

(a) is a halide or an oxyhalide of a metal of Groups IVa, Va, VIa of the Periodic Table, a halide or an oxyhalide of iron, cobalt or nickel, an organometallic compound of a transition element, a titanate, acetonylacetonate of vanadium or titanium; and (b) is an aluminum compound represented by the formula

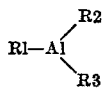

in which R1, R2, and R3 designate identical or different alkyl radicals or hydrogen;

where X is an atom of chlorine, bromine, or iodine, and R1 and R2 have the same significance as above; AlCl$_3$; a compound of the formula

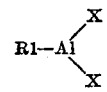

in which R1 and X have the same significance as above; a compound of the formula

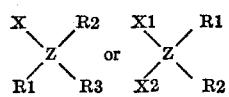

wherein Z is Sn or Be and, as substituents, X, X1, and X2 represent chlorine, bromine, or iodine, and R1, R2 and R3 each represents an alkyl or an aryl radical provided when Z is Be the compound is disubstituted with said substituents; said impurity removing polymer being a poly 4-vinylpyridine (2) maintaining said impurity removing polymer in contact with said solution until said contaminants have been accumulated thereon;

(3) separating said impurity removing polymer with said contaminants retained thereon from said solution;

(4) recovering as a purified product said polymer of recurring units of olefin, diolefin or mixtures of same from said solution;

(5) and regenerating said impurity removing polymer for re-use in a subsequent purifying step by removing therefrom said contaminants.

2. A process as recited in claim 1 in which said treatment of said polymer solution with said poly 4-vinylpyridine is carried out in an inert atmosphere.

3. A process as recited in claim 1 in which said treatment of said polymer solution with said poly 4-vinylpyridine is carried out by admixing said poly 4-vinylpyridine as a powder into said solution and agitating the resulting admixture until said contaminants are accumulated by said poly 4-vinylpyridine.

4. A process as recited in claim 1 in which said treatment of said polymer solution with said poly 4-vinylpyridine is carried out by forming said poly 4-vinylpyridine as a powder into a bed and flowing said solution over said bed until said contaminants are accumulated by said poly 4-vinylpyridine.

5. A process as recited in claim 1 in which the time of contact of said poly 4-vinylpyridine with said polymer solution is within the range of about 3 to 90 minutes.

6. A process as recited in claim 1 in which said olefinic and diolefinic polymers are separated from said solution after purification by precipitation.

7. A process as recited in claim 6 in which said precipitation is effected by cooling said solution.

8. A process as recited in claim 1 in which said olefinic and diolefinic polymers are recovered from said solution by evaporation of said solvent.

9. A process as recited in claim 1 in which said regeneration of said poly 4-vinylpyridine is effected by treating said material with said contaminants thereon with a strong base for neutralizing and removing said contaminants, washing said thus treated material to a neutral pH, and drying said material for re-use.

10. A process as recited in claim 9 which also includes treating said poly 4-vinylpyridine with a strong mineral acid prior to said treatment with said strong base.

11. A process as recited in claim 1 in which said synthesizing processes are Ziegler olefinic and diolefinic polymerizations.

References Cited
UNITED STATES PATENTS

| | | | |
|---|---|---|---|
| 2,929,808 | 3/1960 | Ross et al. | 260—94.9 |
| 3,257,334 | 6/1966 | Chen et al. | 260—2.1 |
| 3,352,894 | 11/1967 | Crain et al. | 260—448 |

JAMES A. SEIDLECK, Primary Examiner

W. F. HAMROCK, Assistant Examiner

U.S. Cl. X.R.

260—2.1, 88.2 S, 93.7, 94.7 N, 94.9 F, 80.78